United States Patent [19]

Knepler

[11] 4,100,538
[45] Jul. 11, 1978

[54] SEED LEVEL SENSOR FOR AUTOMATIC SEED PLANTING APPARATUS

[75] Inventor: John T. Knepler, Chatham, Ill.

[73] Assignee: Dickey-john Corporation, Auburn, Ill.

[21] Appl. No.: 619,515

[22] Filed: Oct. 3, 1975

Related U.S. Application Data

[63] Continuation-in-part of Ser. No. 525,581, Nov. 20, 1974, abandoned.

[51] Int. Cl.² ............................................. G08B 21/00
[52] U.S. Cl. ....................................... 340/617; 221/6; 340/684
[58] Field of Search ................ 340/259, 267 R, 246, 340/244 R; 221/6, 7, 8, 17; 222/25, 26, 27, 28, 56, 57, 59, 63, 64, 65, 66

[56] References Cited

U.S. PATENT DOCUMENTS

| | | | |
|---|---|---|---|
| 2,323,128 | 6/1943 | Hare | 340/244 R |
| 2,545,992 | 3/1951 | Dedio | 340/246 |
| 3,213,438 | 10/1965 | Felice et al. | 340/244 R |
| 3,723,989 | 3/1973 | Fathauer et al. | 340/259 |
| 3,863,241 | 1/1975 | Kimiyamaguchi et al. | 340/259 |
| 3,921,159 | 11/1975 | Steffen | 340/267 R |

Primary Examiner—Glen R. Swann, III
Attorney, Agent, or Firm—Olson, Trexler, Wolters, Bushnell & Fosse, Ltd.

[57] ABSTRACT

A seed level sensor for automatic seed planting apparatus is provided with connecting plugs for connecting the seed level sensor to electrical leads presently existing between a seed dispensing sensor and a seed planter monitor. The seed level sensor includes a switching device connected in one of the lines of the electrical leads between the seed dispensing sensor and the seed planter monitor and which interrupts the operation of the seed dispensing sensor when the level of seeds within the hopper is below a predetermined level. An indicator associated with the seed planter monitor is energized for a given period of time when seeds are below the predetermined level, to alert the operator that a low seed level exists in the hopper.

14 Claims, 7 Drawing Figures

SEED LEVEL SENSOR FOR AUTOMATIC SEED PLANTING APPARATUS

CROSS-REFERENCE TO RELATED APPLICATION

This application is a continuation-in-part of application Ser. No. 525,581 filed Nov. 20, 1974, now abandoned.

BACKGROUND OF THE INVENTION

This invention relates generally to a novel monitoring apparatus, and more particularly to a monitoring apparatus for use in monitoring the level of seeds within a hopper associated with automatic seed planting apparatus. While certain features of this invention may be adapted for many different uses, the disclosure will be facilitated by directing it particularly to the problem of monitoring the level of seed in hoppers associated with the type of apparatus having one hopper of seeds per row being planted. However, it will be understood that the seed level sensing apparatus disclosed herein can be used with automatic seed planting equipment utilizing a common hopper for a multitude of rows of seed being planted.

As is well known, a farmer engaged in mechanized planting of various seeds utilizes automatic seed planting machinery adapted to be pulled behind a tractor. Such seed planting machines usually include a plurality of separate planting devices arranged side by side to simultaneously plant a corresponding plurality of rows of crop. Such rows of crop generally extend for substantial distances from one end to the other. Some of the planting devices presently used are provided with a separate hopper of seeds for each row being planted while other planting devices have a common hopper containing seeds for a plurality of rows of seeds being planted. With either type of seed planting machinery the farmer may run low of seeds in one or more hoppers while the seed planting machinery is operating in the middle of a large field. If this should happen, the farmer then must stop the planting operation and go to the perimeter of the field where additional seeds are usually kept to again fill the hopper or hoppers. This is a time-consuming and arduous task because it may require disconnecting the tractor from the seed planting apparatus and driving the tractor to the perimeter of the field where the seeds are kept. In planting of large fields of hundreds of acres, as is often the case in large, mechanized planting operations, this reduces the planting efficiency and increases cost of the planting of seeds.

The mechanized seed planting apparatus presently used for automatic planting of seeds generally includes seed sensing means associated with each of the seed dispensing units and coupled to a common seed planter monitor. This automatic sensing equipment tells the tractor operator when one of the dispensing units is not operating properly. This malfunction can either take the form of stoppage of seeds being planted or a change in the desired number of seeds being planted per unit area, either a decrease or increase being the case.

SUMMARY OF THE INVENTION

Accordingly, it is an object of this invention to provide a new and improved seed level monitor for use in seed hoppers associated with automatic seed planting apparatus, which seed level monitor is operated in conjunction with seed sensing means associated with the seed dispensing sensors presently on the automatic planting apparatus.

Another object of this invention is to provide a new and novel monitor circuit which is simple and efficient in operation while being relatively inexpensive and easy to manufacture.

Still another object of this invention is to provide a new and novel seed level monitor which can easily be adapted to present seed sensing monitor systems.

Yet still another object of this invention is to provide a novel monitoring apparatus which can be used in conjunction with present seed planting equipment and is adjustable so that a predetermined quantity of seeds in the hopper can be selected to provide a warning that additional seeds should be put into the hopper before continuing on a subsequent run across the field being planted.

Briefly, the seed level sensor of this invention is designed to give the farmer an alarm when the depth of seed in the hopper or hoppers falls below a predetermined level. The advantage to the farmer is that he is forewarned of running out of seed in the middle of a field, as well as knowing when to put additional seeds in the hopper so he can continue his planting operation more efficiently.

The seed level sensor is designed so that it can be used with present seed monitoring systems for detecting the planting of seeds, as is well known in the art. One such seed planting and monitoring system is shown in U.S. Pat. No. 3,723,989 to Fathauer et al., assigned to the same assignee of record and incorporated herein by reference. However, it will be understood that the seed level monitor illustrated herein can be used in conjunction with seed planting and seed monitoring apparatus other than that shown in the above-mentioned patent without departing from the novel concepts of this invention. When the level of seeds within the hopper reaches a predetermined minimum level, a first switching circuit within the hopper will be energized. This first switching circuit is here illustrated as being of the photo-electric type, it being understood that mechanical or weight-sensing switches may be utilized as well. The seed level monitor further includes a second switching circuit for interrupting operation of the seed sensing circuit, thereby interrupting operation of the seed planter monitor. The seed level sensor incorporates a 10 second time delay, more or less, so that when an indication of a malfunction is given at the seed planter monitor for that period the farmer will know that a low seed level condition exits in one or more hoppers. At the end of the 10 second, more or less, time period, the indicating light, buzzer, or whatever other indicating means is used at the seed planter monitor, will be de-energized and the seed dispensing sensor again activated to give a normal indication of seeds being planted. Therefore, the present invention provides a substantial savings because it is compatible with present electronic sensing equipment to give valuable information to the farmer as to the condition of the level of seeds within the seed hoppers.

Many other objects, features and advantages of this invention will be more fully realized and understood from the following detailed description when taken in conjunction with the accompanying drawings wherein like reference numerals throughout the various views of the drawings are intended to designate similar elements or components.

DETAILED DESCRIPTION OF THE ILLUSTRATED EMBODIMENT

Figure 1:
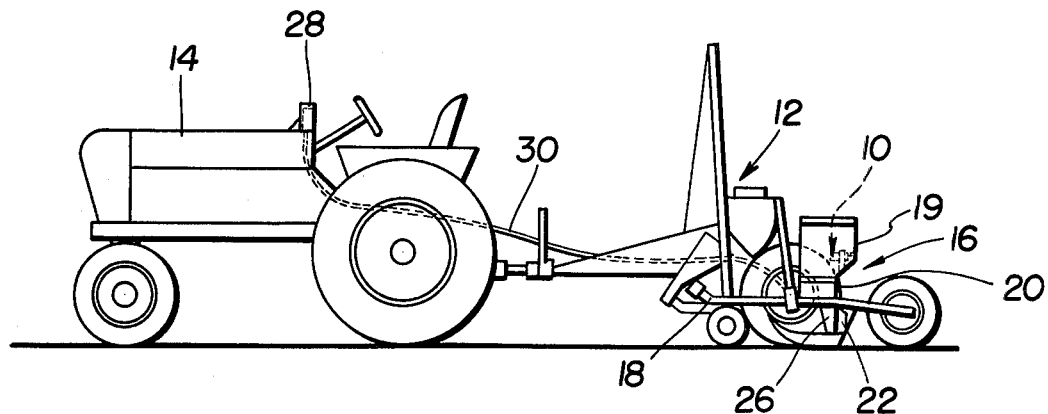
FIG. 1 is a side elevational view of a seed planter in combination with tractor and monitoring apparatus incorporating the features of the present invention.

Referring now more specifically to the drawings, wherein like reference numerals throughout the various views of the drawings are intended to designate similar elements or components, the seed level monitoring apparatus 10 of this invention is used in conjunction with a known seed sensing and seed monitor system of the type disclosed in U.S. Pat. No. 3,723,989 to Fathauer et al. However, it will be understood that the seed level sensing apparatus of this invention can be used in conjunction with other seed monitoring systems if desired.

Turning more specifically to FIG. 1 of the drawings, a seed planter 12 is positioned behind a tractor 14 in a well known manner. The tractor 14 may be of various known constructions and need not be described in detail. It suffices to state that the planter 12 includes a plurality of planting units 16 mounted on a frame 18. In the particular embodiment shown, for the purpose of illustrating one form of this invention; a seed level sensing device 10 is constructed for association with the planter 12 to monitor the quantity of seeds in one or more of a plurality of hoppers 19. In the illustrated embodiment the seed planting apparatus is shown having four seed sensing and seed dispensing hoppers for planting four rows of crop simultaneously. However, it will be understood that the seed planter 12 can have any desired number of seed planting units mounted side by side to plant any desired number of rows of crop simultaneously.

Each of the planting units 16 may also be of any desired known construction and need not be described in detail herein. In general, each planting unit 16 comprises a bin or hopper 19 for storing a supply of seeds to be delivered to a valve or feeding mechanism 20 at the lower end of the hopper for directing the seed, one at a time, into the upper end of an associated assembly housing or boot 22 forming a part of the seed monitoring apparatus, to be described herein below. The associated assembly housing or boot 22 is mounted adjacent to and below its corresponding planting unit 16 for directing seed ultimately to the ground for planting purposes.

The detecting device 26 for detecting the seed flow within the housing or boot 22 is mounted within the boot and senses the actual passage of seed from the planting apparatus to the ground. The seed detecting device produces a pulse which is delivered to a seed planter monitor console 28 located on the tractor 14 and in view of the operator thereof. It will be noted that the seed sensing device 26 is connected to the seed planter monitor console 28 by means of an electrical cable 30 of the multi-conductor type. This enables the seed planter monitor to be disconnected from the seed sensing device if necessary.

In accordance with the novel aspects of this invention, the seed level sensing device 10 is provided with a seed level sensing circuit, interconnecting cables and plugs to be connected directly between the seed planter monitor console 28 and the seed sensing device 26. This enables substantially the same monitor circuitry to be used for also detecting the level of seeds in the hopper or hoppers, thereby providing a substantial saving in cost of materials and labor in forming a more complete monitoring system.

Figure 2:
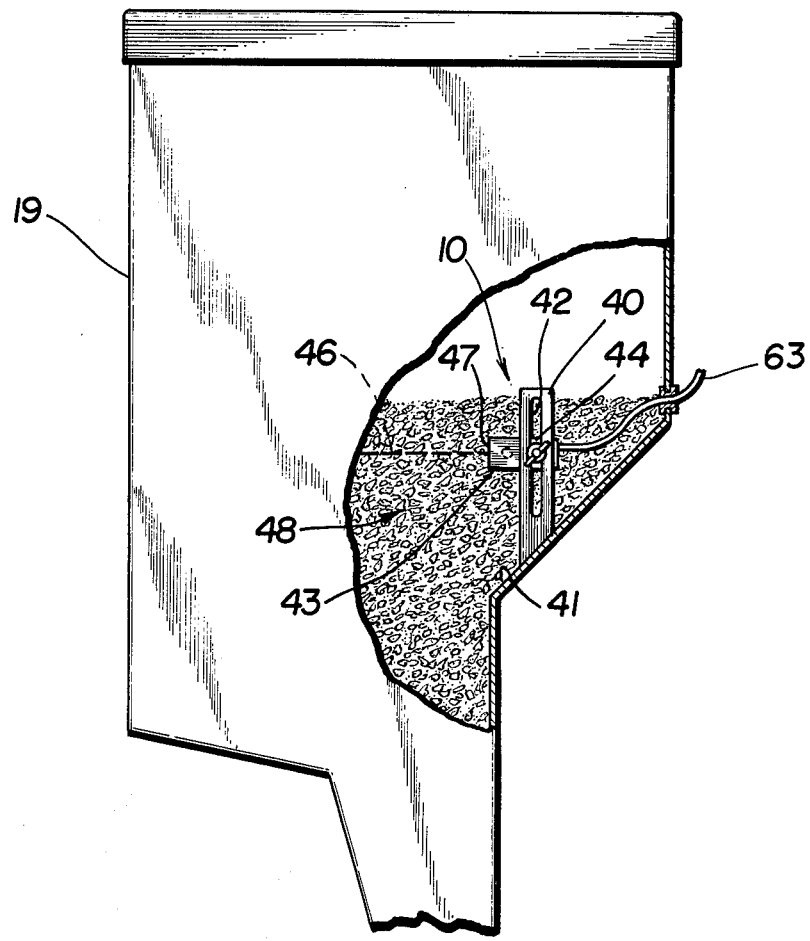
FIG. 2 illustrates a hopper with portions broken away to show the seed level monitor sensor unit of the present invention.

Referring now to FIG. 2 there is seen an enlarged fragmentary view of the hopper 19 with portions thereof broken away to illustrate the positioning and cooperation of the seed level sensing device 10. The seed level sensing device 10 includes a mounting bracket 40 secured to the inner wall surface 41 of the hopper 19. The mounting bracket 40 may be secured by welding, bolting or riveting, as desired. The mounting bracket 40 is positioned substantially upwardly and includes an elongated slot 42. A U-shaped housing 43 is slidably mounted to the bracket 40 by means of a boss or flange 44 formed on the member 43. The position of the U-shaped housing 43 is selected so that a desired seed level can be set. In the illustrated embodiment it is intended that the seed level at which the seed level sensing device 10 is positioned be that which gives the tractor operator sufficient time to finish a given row of seed planting before the hopper is completely empty of seeds. This then saves the farmer substantial time and eliminates the possibility of running out of seeds in the middle of a row.

In the illustrated embodiment of FIG. 2 the seed level is indicated by the broken line 46. A switching device indicated generally by reference numeral 47 is positioned within the U-shaped housing 43 so that when a plurality of seeds 48 are positioned about the switching device, the switching device will be actuated to provide a first signal condition to indicate that the seeds within the hopper are either equal to or above the seed level indicated by reference numeral 46. When the seeds within the hopper drop below the seed level indicated by reference numeral 46, the switching device 47 will provide a second signal condition which, in turn, will give an indication at the seed planter monitor 28 to warn the tractor operator that a low seed level condition exists in one or more of the hoppers. This will be described in more detail herein below with regard to FIGS. 4, 5 and 6.

Figure 3:
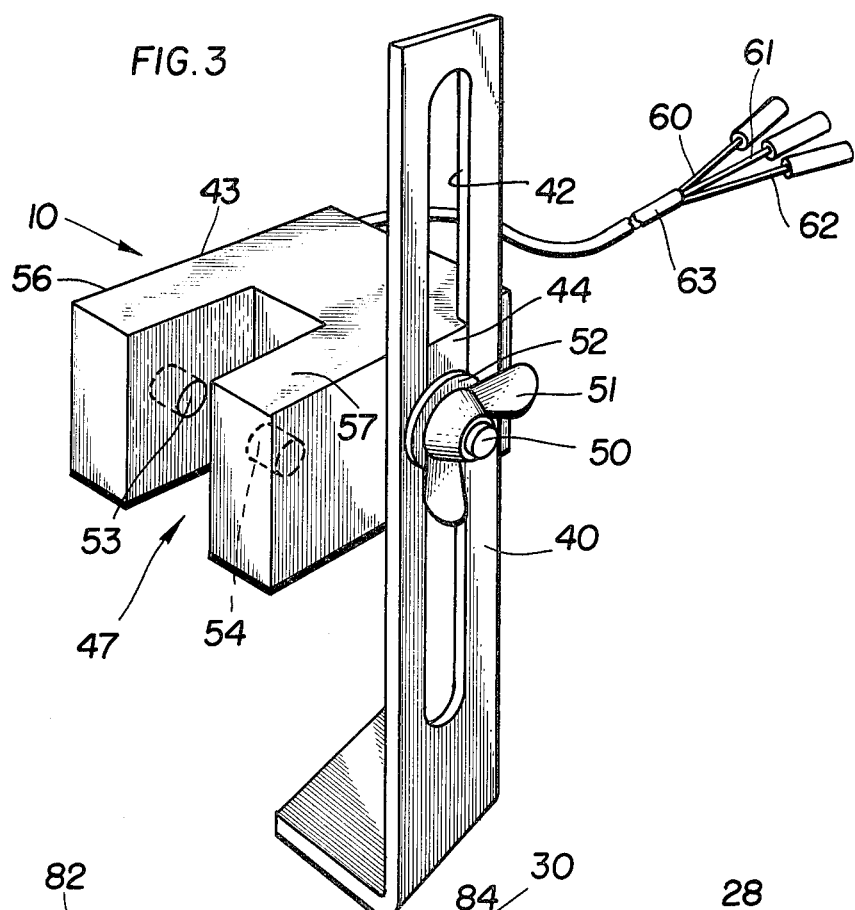
FIG. 3 is a perspective view of the seed level sensor unit and mounting bracket including the three-wire cable connected thereto in accordance with the present invention.

Referring now to FIG. 3, the details of the level sensing device 10 are more clearly illustrated. The U-shaped housing 47 is held in position on the bracket 40 by means of a threaded shaft or stud member 50 and a wing nut 51. A flat washer 52 is provided to overlap the boss portion 44 and slot 42 to lock the U-shaped housing 47 at the desired location along the slot 42.

Most advantageously, the switching device 47 utilized in the illustrated embodiment is that of a light-emitting diode 53 and a photocell 54 secured to diametrically opposed arm portions 56 and 57, respectively, of the U-shaped housing 47. The light-emitting diode 53 is substantially directly opposite that of the photocell 54 to direct a finite light beam thereupon. The presence of a light beam upon the photocell 54 results in a low resistance condition of the photocell. On the other hand, the absence of the light beam on the photocell 54 produces a high resistance condition of the photocell. It will be understood that the resistance conditions of the photocell may be reversed if desired. The electronic components associated with the light-emitting diode and photocell are preferably mounted within the housing 43 but it will be understood that the components may be mounted elsewhere if desired. The power to operate the light-emitting diode 53 and photocell 54 and their associated circuitry, is delivered through a plurality of lines 60, 61 and 62 associated with a multi-conductor cable 63. The lines 60, 61 and 62 may be provided with suitable plug means for connection to the circuitry associated with the seed level sensing system.

Figure 4:
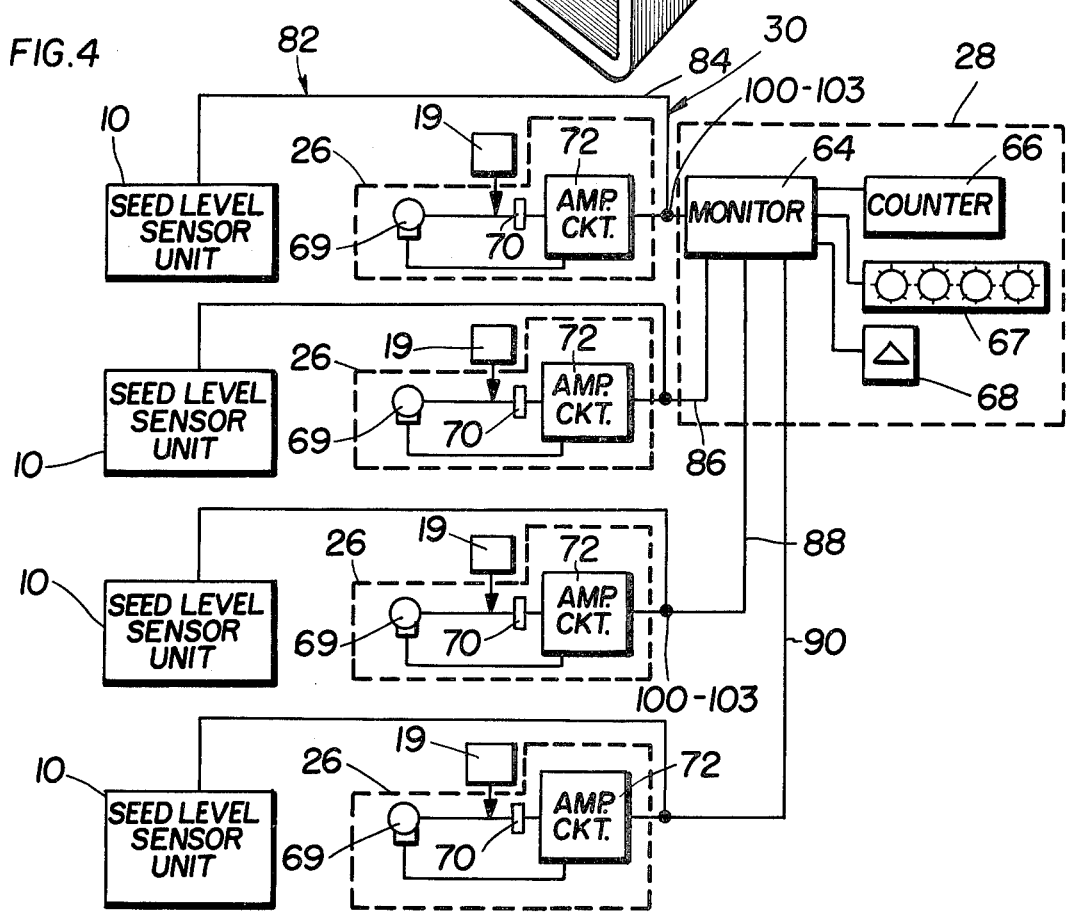
FIG. 4 is a block diagram of the seed monitoring apparatus of the present invention.

For a better understanding of the seed level sensing apparatus of this invention, as well as the seed level sensor 10, reference is now made to FIG. 4. As stated above, the seed monitoring apparatus used with the automatic seed planting equipment includes a plurality of seed detecting devices 26, one such device for each row of seed being planted. In the example shown in FIG. 4 there are four seed-dispensing detectors illustrated, it being understood that more or less may be utilized if desired. The seed monitoring apparatus is illustrated in block diagram form and includes a control panel representing the seed planter monitor console 28 which is mounted on the tractor 14, as shown in FIG. 1. The control panel 28 includes a monitor circuit 64 which is fully disclosed and described in U.S. Pat. No. 3,723,989 to Fathauer et al. and assigned to the same assignee of record. While the particular monitor shown in Fathauer is incorporated herein by reference, it will be understood that other seed monitoring systems can utilize the seed level sensor unit of this invention. The output of the monitor circuit 64 is connected to a read-out counter 66 for giving count information as to the actual number of seeds being planted. This count information is accomplished on a row-by-row basis through suitable standing or switching circuits or through a summer circuit to give a total indication of the number of seeds planted for all of the rows. The monitor circuit 64 is also connected to a plurality of indicating lamps designated generally by reference numeral 67. The indicating lamp 67 may be maintained in a de-energized state when the seed planting apparatus is operating in a normal manner and in an energized state when one or more of the seed planting units malfunctions, the number or position of the light thus corresponding to the number or position of the particular seed planting unit which has malfunctioned.

The monitor circuit 64 is also connected to an audible indicating alarm unit 68 to provide means for further attracting the attention of the tractor operator to the energization of the indicating lamp should a malfunction of either the seed dispensing sensor or the seed level sensor occur. The plurality of seed sensing devices 26 each include a light source 69 to operate a photo-responsive device 70 associated therewith. The output of the photo-responsive device is coupled to an amplifier circuit 72 for amplifying the signal and delivering it to the monitor circuit 64 of the seed planter monitor console 28. As a seed from the hopper 19, here represented diagrammatically, passes from the hopper through the dispensing chute, it produces an output signal within the photo-responsive device 70 by either interrupting a light beam or causing light to be reflected from the seed to the photo-responsive device. In either case, a pulse signal is developed for each seed passing through the seed dispensing apparatus.

In accordance with this invention, the seed level sensor units 10 are connected in circuit with each of their associated seed sensors 26 through a multi-conductor cable 82 which has a plurality of electrical leads 84, 86, 88 and 90. The multi-conductor cable 82 corresponds to the cable 30 of FIG. 1 and is part of the cable 63 of FIG. 3.

Figure 5:
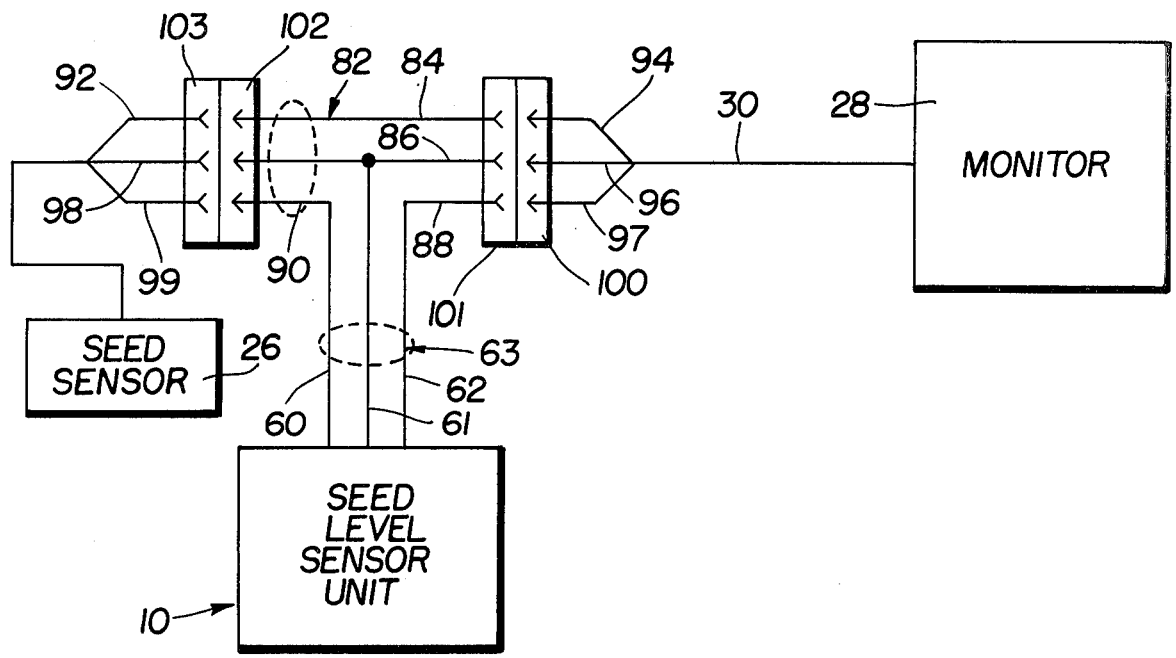
FIG. 5 is a block diagram of the wire harness used to interconnect the seed level sensor with the seed dispensing sensor of the present invention.

Referring now to FIG. 5 there is seen the details of construction of the interconnecting cable 82 which is to be interposed between the seed sensor 26 and the planter monitor unit 28. Here the interconnecting multi-conductor cable 82 is provided with the leads 84, 86, 88 and 90. The electrical lead 84 is an interconnection between the output signal means of the seed sensor 26 to the seed planter monitor 28. The pulse signal information corresponding to the passage of seeds from the seed sensor 26 goes through a line 92 and the line 84 and into a line 94 to the seed planter monitor 28. This is to be considered the control signal line. Operating power from the seed planter monitor 28 to the seed sensor 26 is delivered over lines 96 and 97 to lines 98 and 99, respectively, to provide the necessary operating voltage on the circuitry associated with the seed level sensor unit 10.

Lines 94, 96 and 97 are associated with a plug 100 which, in turn, cooperates with a mating plug 101. The interconnecting cable 82 also includes a plug 102 to cooperate with a plug 103 associated with the seed sensor. Plugs 100 and 103 are normally connected together so that a direct connection from the seed sensor 26 is made to the seed planter monitor 28. In accordance with the principles of this invention, the seed level sensor unit is interposed between the seed sensor 26 and seed planter monitor 28 to interrupt operation thereof should the level of seed within the hopper 19 drop below a predetermined level. In the illustrated embodiment, the power leads 88 and 90 are interrupted to give an indication of a low seed level. However, the signal lead 84 may be interrupted if desired.

Figure 6:
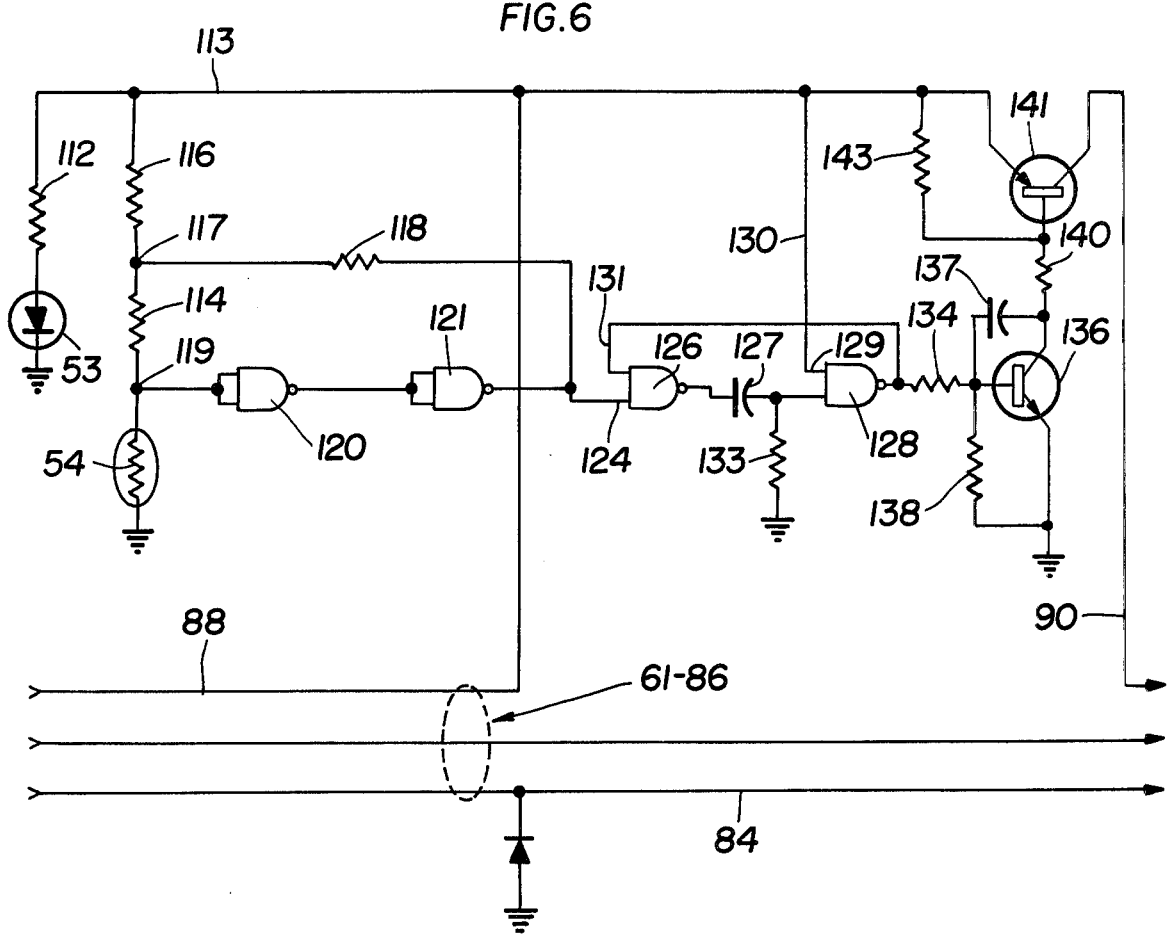
FIG. 6 is a detailed schematic diagram of the electronic switching circuit utilized to interrupt the seed dispensing sensor in accordance with the present invention.

For a better understanding of the circuitry associated with the seed level sensor unit 10, reference is now made to FIG. 6 which is a detailed schematic diagram of the logic circuitry utilized. While the present embodiment utilizes a digital logic approach to provide a switching action between lines 88 and 90, it will be understood that other electronic circuitries may be utilized if desired such as discrete transistors or the like.

FIG. 6 is a detailed schematic showing of the circuitry associated with the seed level sensing unit 10. The components of the circuit of FIG. 6 may be located within the housing 43 or they may be located elsewhere. The light-emitting diode 53 is connected in series with a current-limiting resistor 112 and receives operating power from a line 113 connected to the input line 88. Also connected to line 113 is the photocell 54 through a pair of series-connected resistors 114 and 116. The circuit point 117 between resistors 114 and 116 is coupled to a feedback resistor 118 while the circuit point 119 is coupled to both inputs of a two-input NAND gate 120. The output of NAND gate 120 is connected to a second two-input NAND gate 121 which, in turn, has its output coupled back through resistor 118 to circuit point 117 to provide a feedback. The feedback provides a snap-action of the switching circuit formed by NAND gates 120 and 121. The output of NAND gate 121 is delivered to one input line 124 of a NAND gate 126. The NAND gate is capacitive-coupled through a capacitor 127 to one input of a second NAND gate 128.

The NAND gate 128 has a second input 129 coupled to the line 113 through a line 130. The output of NAND gate 128 is fed back to the second input 131 of NAND gate 126 and thereby forms a one-shot timing circuit. A resistor 133 has one end thereof coupled to the first input of NAND gate 128 and the other end thereof coupled to ground potential to provide a signal-developing element for a pulse passing through the capacitor 127. The output of NAND gate 128 passes through a resistor 134 to the base electrode of a transistor 136. The collector electrode of transistor 136 is coupled back to the base electrode through a capacitor 137. A biasing resistor 138 is connected between the base electrode and ground potential. The collector electrode of transistor 136 is coupled through a resistor 140 to the base electrode of a switching transistor 141. Switching transistor 141 provides switching means to connect and disconnect lines 88 and 90 when the seed within the hopper is above and below, respectively, the desired seed level, as indicated by the broken line 46 of FIG. 2. The base electrode of transistor 141 is coupled to the emitter electrode thereof through a resistor 143.

In operation, when no seeds are present between the arm portions 56 and 57 of the U-shaped support housing 47, the photocell 54 is illuminated by the light-emitting diode 53, and by any available ambient light. The light signal on photocell 54 will produce a low voltage at the input terminals of the NAND gate 120 and a high voltage condition at the output terminals thereof. The NAND gate 121 inverts the high voltage condition at its input and delivers a portion of the output signal through the feedback resistor 118 to provide a snap-action of the switching circuit. The low-going signal at the input of the one-shot timing circuit, consisting of gates 126 and 128, capacitor 127 and resistor 133, activates the timing circuit for a period of about 10 seconds more or less. This will cause transistor 136 to invert and amplify the timer output signal which, in turn, renders transistor 141 non-conductive. When transistor 141 is non-conductive, the circuit between lines 88 and 90 is open and power is removed from the seed sensing unit 26 associated therewith. At the end of the 10 second period, the one-shot timing circuit returns to its stable state and transistor 141 is again rendered conductive to apply power to the seed sensing unit 26. Therefore, the seed level sensor of this invention disables the seed sensor for a short period of time to give an indication of the level of seed in the hopper and then automatically enables the seed sensor for continued sensing of seeds delivered to the ground.

Figure 7:
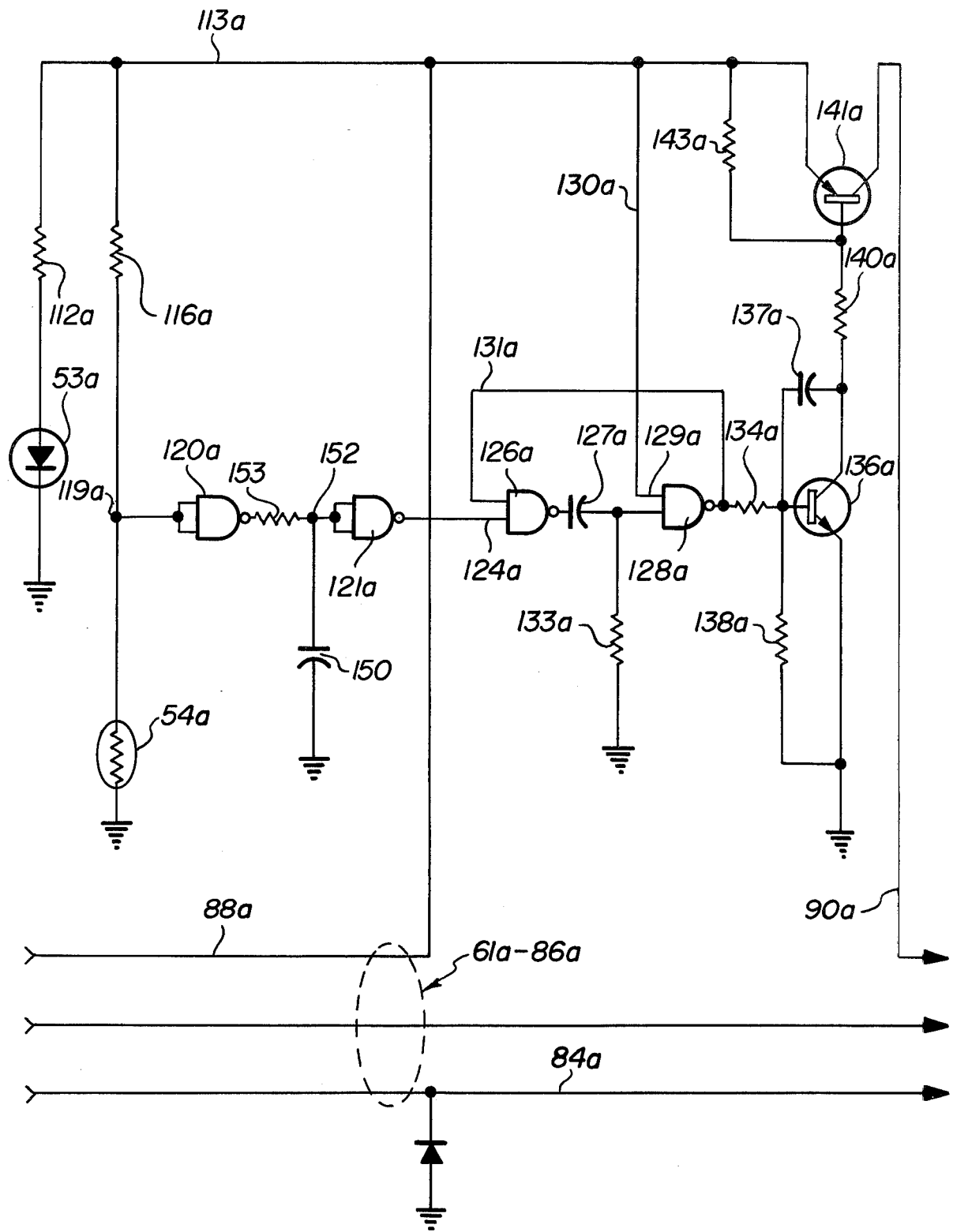
FIG. 7 is a schematic diagram of an electronic switching circuit incorporated in a modified form of the present invention.

Referring now to FIG. 7, there is shown a schematic circuit similar to the circuit shown in FIG. 6 as indicated by the application of identical reference numerals with the suffix *a* added to corresponding elements. In this embodiment, the feedback portion of the circuit including the above-described resistors 118 and 114 associated with NAND gates 120 and 121 has been eliminated. Furthermore, time delay means in the form of a capacitor 150 connected to circuit point 152 between NAND gates 120a and 121a and the ground is provided. A current limiting resistor 153 is connected between the capacitor and NAND gate 120a. It has been found that in certain instances a void may appear in a seed hopper so that the photocell 54 of the circuit shown in FIG. 6 or 54a of the FIG. 7 circuit will see light even though the seed level in the hopper has not actually fallen below the level intended to be sensed. Such voids may occur due to bridging of seed in the hopper or for a variety of other reasons and are usually of short duration. When conditions exist that may create such voids, the fast acting circuitry of FIG. 6 may see a void and provide a signal on the monitor indicating that the hopper is empty or at least that the seed has fallen below a predetermined critical level. In such circumstances, the circuitry of FIG. 7 is particularly advantageous since the time delay provided by the capacitor 150 is sufficient so that the photocell must see light for a substantial length of time which may be on the order of a few seconds before the remaining portion of the monitor circuit will be energized and during such time interval any void in the seed supply will usually be filled in.

What has been described is a simple and efficient means for monitoring the level of seeds in hoppers of automatic seed planting equipment. While preferred embodiments of the invention have been disclosed herein, it will be understood that variations and modifications may be effected without departing from the spirit and scope of the novel concepts disclosed and claimed herein.

The invention claimed is as follows:

1. A monitor for interconnection with seed planting apparatus having seed dispensing means including a hopper for containing seeds, seed sensing means associated with said dispensing means, and indicator means interconnected with said seed sensing means through electrical lead means for indicating a malfunction of the seed dispensing means, said monitor comprising: first switch means connectible in series in said lead means between said seed sensing means and said indicator means for providing a first switching state during one instance and a second switching state during another instance, seed level sensing means for mounting within the hopper of said seed dispensing means, said seed level sensing means including signal means for producing a first signal condition when the level of seeds within the hopper is above a predetermined level and for producing a second signal condition when the level of seeds within the hopper is below said predetermined level, and circuit means coupled between said seed level sensing means and said first switch means for causing said first switch means to be in said first switching state during said first signal condition and in said second switching state during said second signal condition, said first switching means thereby causing the operation of said indicating means when in said second switching state to give an indication that the seed level within the hopper is below said predetermined level.

2. A monitor as set forth in claim 1 which includes means coupling said first switch into said lead means, said connector means comprising a pair of plugs, one plug for plugging into a mating plug connected to a portion of the lead means connected to said seed sensor and another plug for plugging into a mating plug connected to another portion of said lead means connected to said indicating means.

3. A monitor as set forth in claim 1 wherein said first switch means includes a transistor having base, emitter and collector electrodes, said emitter and collector electrodes forming a switching junction therebetween for providing closed and open circuit conditions when said transistor is conductive and non-conductive; respectively, said transistor being conductive during said first signal condition of said level sensing means and being non-conductive during said second signal condition of said seed level sensing means.

4. A monitor as set forth in claim 3 wherein said circuit means includes a one-shot timing circuit coupled to the base electrode of said transistor, said one-shot timing circuit disabling said transistor for a predetermined period of time during said second signal condition of said seed level sensing means for giving an indication that the level of seeds within the hopper is below said predetermined level.

5. A monitor as set forth in claim 3 wherein said seed level sensing means includes spaced apart support arms for mounting within the hopper, said support arms being spaced apart a distance to enable seeds within the hopper to pass therebetween, second switch means mounted to said support arms and responsive to seeds gathered between said support arms for providing said first signal condition, and responsive to the absence of seeds between said support arms for providing said second signal condition.

6. A monitor as set forth in claim 5 wherein said second switch means includes a photo-responsive element mounted to one of said support arms, and a light source mounted to the other of said support arms for directing light toward said photo-responsive element, whereby seeds gathered between said support arms will cause said photo-responsive element to produce said first signal condition and the absence of seeds between said support arms will cause said photo-responsive element to produce said second signal condition.

7. A monitor as set forth in claim 6 wherein said light source is a light-emitting diode.

8. A seed monitor apparatus for a planter including seed dispensing means and hopper means for containing seeds to be dispensed, said monitor apparatus comprising: seed sensing means mountable on said seed dispensing means for indicating a malfunction of the seed dispensing means, indicator means operatively interconnected with and operable in response to said sensing means, first switch means coupled between said seed sensing means and said indicator means for providing a first switching state during one instance and a second switching state during another instance, seed level sensing means mountable within said hopper for producing a first signal condition when the level of seed within the hopper is above a predetermined level and for providing a second signal condition when the level of seed within said hopper is below said predetermined level, and circuit means coupled between said seed level sensing means and said first switch means for causing said first switch means to be in said first switching state during said first signal condition and in said second switching state during said second signal condition, said first switch means interrupting the operation of said indicator means when in said second switching state thereby giving an indication that the seed level within the hopper is below said predetermined level.

9. A seed monitor apparatus as set forth in claim 8 wherein said first switch means includes a transistor having base, emitter and collector electrodes, said emitter and collector electrodes forming a switching junction therebetween for providing closed and open circuit conditions when said transistor is conductive and non-conductive, respectively, said transistor being conductive during said first signal condition of said seed level sensing means and being non-conductive during said second signal condition of said level sensing means.

10. A seed monitor apparatus as set forth in claim 9 wherein said circuit means includes a one-shot timing circuit coupled to the base electrode of said transistor, said one-shot timing circuit disabling said transistor for a predetermined period of time during said second signal condition of said seed level sensing means for giving an indication that the level of seeds within said hopper is below said predetermined level.

11. A seed monitor apparatus as set forth in claim 9 wherein said seed level sensing means includes spaced apart support arms mounted within said hopper, said support arms being spaced apart a distance to enable seeds within the hopper to pass therebetween, second switch means mounted to said support arms and responsive to seed gathered between said support arms for providing said first signal condition, and responsive to the absence of seeds between said support arms for providing said second signal condition.

12. A seed monitor apparatus as set forth in claim 11 wherein said second switch means includes a photo-responsive element mounted to one of said support arms, and a light source mounted to the other of said support arms for directing light toward said photo-responsive element, whereby seeds gathered between said support arms will cause said photo-responsive element to produce said first signal condition and the absence of seeds between said support arms will cause said photo-responsive element to produce said second signal condition.

13. A seed monitor apparatus as set forth in claim 12 wherein said light source is a light-emitting diode.

14. A seed monitor apparatus as set forth in claim 9 wherein said circuit means includes feedback means for promoting fast switching from said first switching state to said second switching state.

* * * * *

UNITED STATES PATENT AND TRADEMARK OFFICE
CERTIFICATE OF CORRECTION

PATENT NO. : 4,100,538
DATED : July 11, 1978
INVENTOR(S) : John T. Knepler

It is certified that error appears in the above-identified patent and that said Letters Patent are hereby corrected as shown below:

Col. 7, line 9, "The NAND" should be --This NAND--;

Col. 8, line 63, "connector" should be --coupling--;

Col. 9, line 8, after "said" insert --seed--.

Signed and Sealed this

Twentieth Day of February 1979

[SEAL]

Attest:

RUTH C. MASON
Attesting Officer

DONALD W. BANNER
Commissioner of Patents and Trademarks